United States Patent
Tobata et al.

(10) Patent No.: US 9,327,627 B2
(45) Date of Patent: May 3, 2016

(54) UNLOCKING MECHANISM FOR INCLINABLE HEADREST

(71) Applicants: Hideo Tobata, Akishima (JP); Takayuki Yoshiga, Akishima (JP); Yutaka Sodeno, Akishima (JP)

(72) Inventors: Hideo Tobata, Akishima (JP); Takayuki Yoshiga, Akishima (JP); Yutaka Sodeno, Akishima (JP)

(73) Assignee: TACHI-S CO., LTD. (JP)

( * ) Notice: Subject to any disclaimer, the term of this patent is extended or adjusted under 35 U.S.C. 154(b) by 292 days.

(21) Appl. No.: 13/753,154

(22) Filed: Jan. 29, 2013

(65) Prior Publication Data

US 2014/0210245 A1    Jul. 31, 2014

(51) Int. Cl.
     *B60R 22/28*    (2006.01)
     *B60N 2/48*    (2006.01)

(52) U.S. Cl.
     CPC .............. *B60N 2/4847* (2013.01); *B60N 2/4844* (2013.01)

(58) Field of Classification Search
     USPC ...................... 297/408, 411.3, 411.32, 411.38
     See application file for complete search history.

(56) References Cited

U.S. PATENT DOCUMENTS

| | | | | |
|---|---|---|---|---|
| 4,113,309 | A * | 9/1978 | Brockway | 297/408 |
| 7,681,955 | B2 * | 3/2010 | Seo | 297/408 |
| 8,231,177 | B2 * | 7/2012 | Jammalamadaka et al. | 297/408 |
| 2008/0277989 | A1 * | 11/2008 | Yamane et al. | 297/408 |
| 2013/0134761 | A1 * | 5/2013 | Willard et al. | 297/408 |

FOREIGN PATENT DOCUMENTS

| | | |
|---|---|---|
| JP | 1-164310 | 6/1989 |
| JP | 8-224139 | 9/1996 |
| JP | 2001-46170 | 2/2001 |
| JP | 2012-162123 | 8/2012 |

* cited by examiner

*Primary Examiner* — David R Dunn
*Assistant Examiner* — Jody Giacoman
(74) *Attorney, Agent, or Firm* — Ostrolenk Faber LLP (57) ABSTRACT

An unlocking mechanism of inclinable headrest includes a push button having a connecting element and an internal frame having a cylindrical element defining a through-bore in which the push button is slidably accommodated. Provided within the internal frame is a slidable lever element having one end operatively connected with a lock gear for locking the headrest and another end having a connecting hole in which the connecting element of the push button is resiliently inserted and engaged. The slidable lever element is slidably supported by a guide element so that the connecting hole thereof is retained at a location corresponding to the through-bore of the cylindrical element. Hence, in assembly, simple insertion by a worker of the push button in the cylindrical element results in quick and precise connection of the push button's connecting element with the slidable lever element's connecting hole invisibly disposed in the headrest.

8 Claims, 3 Drawing Sheets

UNLOCKING MECHANISM FOR INCLINABLE HEADREST

BACKGROUND OF THE INVENTION

1. Field of the Invention

The present invention generally relates to a headrest of adjustingly inclinable type for use with an automotive seat, which includes an inclination adjustment mechanism wherein a lock may be engaged with and disengaged from a stationary gear element, such as a ratchet gear, to permit adjustable inclination of the headrest at a desired angle for supporting a seat occupant's head. In particular, the invention is directed to an unlocking mechanism of a push button type operable for unlocking such inclination adjustment mechanism provided in this sort of headrest.

2. Description of Prior Art

Among various inclinable headrests for automotive seat, there is known a headrest of inclinable type having a push-button-type unlocking mechanism provided therein, wherein an unlocking push button is movably provided in a wall of the headrest and operatively connected with an inclination adjustment mechanism provided within the headrest. The inclination adjustment mechanism, for example, comprises a stationary gear element, such as a ratchet gear, fixedly provided to the headrest, and a lock gear vertically rotatable for engagement with and disengagement from the stationary gear element. The lock gear is operatively connected with the push button, so that, when a user presses that push button, the lock gear is rotated upwardly out of engagement with the stationary gear element to thereby release the headrest from a locked state. Therefore, the user can adjustingly incline the headrest forwardly and rearwardly in order to set the headrest at a desired angle of inclination As disclosed for example in Japanese Laid-Open Patent Publication No. 1-164310 (JP 1-165310 A), there is known an inclinable headrest of the above-stated kind having an unlocking push button movably provided in one lateral wall of a body of the headrest which is covered with a trim cover assembly. In this prior art, the layer of the trim cover assembly overlies the push button, for which reason, the push button itself is not exposed and invisible from the outside. A marking is therefore affixed on the outer surface of trim cover assembly at an area where the push button exists under the trim cover assembly, so that a user can recognize the location of the push button and can push such marked area to cause depression of that push button for unlocking an inclination adjustment mechanism provided in the headrest. But, the user must strongly push that marked area against the tension of the trim cover layer until the push button is completely pressed to unlock the inclination adjustment mechanism.

With regard to the inclination adjustment mechanism, for example Japanese Laid-Open Patent Publications Nos. 8-224139 (JP 8-224139 A) and 2012-162123 (JP 2012-162123 A) show a well-known ratchet-type inclination adjustment mechanism for use with an inclinable headrest, in which a ratchet gear is fixedly provided to the headrest and a lock gear is vertically rotatable for engagement and disengagement with and from the ratchet gear, thereby allowing adjustment of inclination of the headrest in forward and rearward directions.

Figure 2:
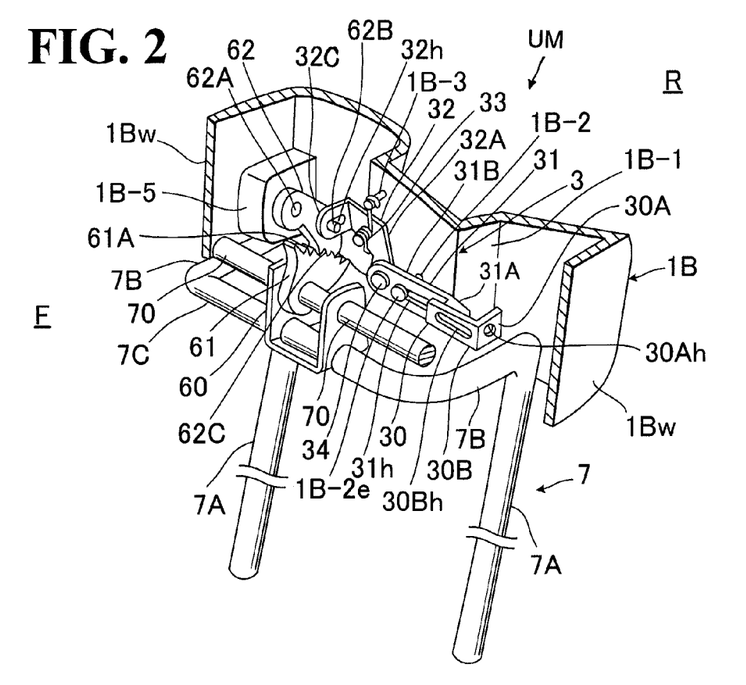
FIG. 2 is a partly broken schematic perspective view showing the push-button-type unlocking mechanism provided in the inclinable headrest in accordance with the invention.

In contrast to the above-described inclinable headrest of the type wherein a push button is invisibly disposed inside of the headrest, there is also known an inclinable headrest of the type having a push button partially exposed and visible from the outside, which enables a user to directly press the push button to release the headrest from a locked state. Reference is now made to FIG. 2 which shows an inclinable headrest of this kind in the present invention. While the headrest of such outwardly-exposed-push-button type is well known, the FIG. 2 is used provisionally in this description of prior art to show a typical known outer configuration of headrest wherein an outwardly exposed push button is provided, for the sake of clarity, since no prior-art material is found to clearly show such outwardly exposed push button, on the side of the inventors and assignees involved in the present invention. Namely, as understandable from FIG. 2 just by way of example, there is indeed a known inclinable headrest having an unlocking push button (at 2) provided in one lateral wall of the headrest so as to be partially exposed and readily accessible from the outside, and any person skilled in the art knows that particular type of inclinable headrest.

However, as one of technical problems with such push-button unlocking type of headrest, it has been difficult for a worker to quickly and precisely connect a push button from the outside to the inclination adjustment mechanism stated above. For example, as shown in the afore-stated JP 1-164310 A, the inclination adjustment mechanism is disposed within the headrest, and a connecting end portion of that inclination adjustment mechanism, adapted for connection with a push button, is located far deeply in a hole formed in the body of the headrest. Hence, a worker can not visually ascertain a precise position of such connecting end portion from the outside. If the worker connects a push button through the afore-said hole to the connecting end portion from the outside, he or she must manage to connect the push button with the connecting end portion within the hole, depending on his or her imagination and fingers' feeling, which is a troublesome time-consuming problem. Therefore, it has been impossible for the worker to quickly and precisely connect the push button with the invisible connecting point in the headrest.

As a solution to that problem, the afore-said connecting end portion of headrest inclination mechanism may be extended to a point near to the outside of the afore-said hole in which the push button is slidably stored, in an attempt to enable a worker to easily connect the push button therewith, which is for example disclosed in Japanese Laid-Open Patent No. 2001-46170 (JP 2001-46170). This prior-art literature shows an unlocking mechanism for allowing a headrest to be folded downwardly by a manual pushing operation, which includes a laterally slidable lever element and an operating portion integral therewith, the operating portion extending outwardly form that lever element. According thereto, pushing the operating portion causes the lever element to slidingly move laterally of the headrest to actuate an unlocking element, thereby allowing the headrest to fold downwardly. From the drawings of this JP 2001-46170, it is seen that the lever element is disposed in a frame and the operating portion of the lever element passes through a ringed portion of the frame and extends to a point near to the outside of the headrest, and therefore, any person skilled in the art can readily understand that such outwardly extended operating portion is to be situated within a through-hole defined in an upholstery layer of the headrest adjacent to the ringed portion of the frame and that a push button is movably stored in such through-hole, though not shown. Therefore, any person skilled in the art will readily notice that, in assembly, an end of the operating portion will be disposed near to an outwardly facing side of the through-hole and a worker will insert a push button in the through-hole and connect the push button with the end of the operating portion disposed within the through-hole.

However, even with such construction, a precise connection between the push button and the end of the operating portion can not be visually observed by the eyes of the worker, because the push button itself is inevitably to conceal the end of the operating portion in relation to the hole when the worker begins to insert the push button in the through-hole and connect the same with the end of the operating portion. Thus, it is still annoyingly required for the worker to use his or her imagination and fingers' feeling to complete connection of the push button with the operating portion. Further, the extended operating portion is not supported by any supporting element, with the result that there is a great likelihood that the operating portion will be bent or dislocated from a predetermined position during assembly of the mechanism and headrest, prior to that operating portion being connected with the push button. In that case, it is extremely difficult for a worker to connect a connecting region of the push button with the operating portion. Still further, such provision of extended operating portion results in a greatly increased dimensions of the unlocking mechanism on the whole. In this regard, the headrest previously stated in the JP 1-165310 A also results in such increase of internal mechanisms and parts in a headrest. According to such JP 1-165310 A, in a lateral wall of an internal frame accommodating the mechanisms, all mechanical parts associated with a push button are collectively provided, with the result that a whole of the internal frame is inevitably formed so large that the lateral wall thereof is disposed near to a corresponding lateral side of an upholstery of the headrest. This is indeed necessary to locate the mechanical parts adjacent to a hole formed in that lateral side of upholstery, the hole being so adapted that the push button is movably stored. Hence, in this prior art, such large formation of internal frame is inevitably required, and the internal mechanical parts associated with the push button have to be disposed exteriorly of the lateral wall of the internal frame adjacent to the hole in which the push button is movably stored.

As a consequence of the foregoing conventional defective factors, it has been impossible for a worker to quickly and precisely connect a push button to an adjustment mechanism provided within a headrest, which prevents rapid assembly of the headrest, and also, the sizes of internal mechanical parts associated with the push button are inevitably increased.

SUMMARY OF THE INVENTION

In view of the above-stated drawbacks, it is a purpose of the present invention to provide an improved unlocking mechanism for an inclinable headrest, which not only allows a worker to easily and quickly connect a push button with a headrest inclination adjustment mechanism invisibly disposed within the headrest, but also allows a lever element for connection with the push button to be made small in size and length.

In order to achieve such purpose, according to the present invention, in a headrest of inclinable type including a covering element and an inclination adjustment mechanism operable for adjustment of inclination of the headrest, the inclination adjustment mechanism including a stationary gear and a lock gear movable for engagement with and disengagement from said stationary gear, there is provided an unlocking mechanism which basically comprises:

a three-dimensional frame provided within the headrest, the three-dimensional frame having an inner surface facing to the inside thereof and an outer surface facing to the outside thereof;
wherein the inclination mechanism is disposed within the three-dimensional frame;
a cylindrical element formed integrally with the three-dimensional frame so as to project outwardly from the outer surface of the three-dimensional frame, the cylindrical element having a through-bore defined therein, the through-bore communicating the inside of the three-dimensional frame with the outside thereof;
a guide element formed in the inner surface of the three-dimensional frame so as to project inwardly of the three-dimensional frame;
wherein the covering element is affixed on said three-dimensional frame, such that said through-bore of said cylindrical element opens in the covering element;
a lever element disposed within the three-dimensional frame and operatively connected with the lock gear, the lever element including: an elongated guide hole element defined therein; a connecting portion situated at a location corresponding to the cylindrical element; and a connecting hole defined in the connecting portion;
the lever element being at the elongated guide hole element thereof slidably engaged with the guide element, such that the connecting hole thereof is maintained at a point corresponding to the through-bore of the cylindrical element;
a push button including a connecting element so formed as to project outwardly therefrom, the connecting element including a resilient anchor region having an outer shape slightly larger than the connecting hole of the lever element, the resilient anchor region being capable of resilient squeeze in and passage through the connecting hole and also capable of resilient recovery of the shape thereof subsequent to such resilient squeeze and passage thereof through the connecting hole;
the push button being slidably accommodated in the cylindrical element and securely connected at the connecting element thereof with the connecting portion of the lever element by being slidingly inserted in the through-bore of the cylindrical element to such an extent that the resilient anchor region of the push button is resiliently squeezed in and passed through the connecting hole of the lever element and subsequently recovers the shape thereof resiliently, so that the connecting element of the push button is securely connected via the resilient anchor region thereof with the connecting portion of the lever element; and
the push button being normally exposed partially in the cylindrical element as well as in the covering element.

Accordingly, in assembly, simple insertion by a worker of the push button in the cylindrical element results in quick and precise connecting of the push button's connecting element with the lever element's connecting hole invisibly disposed in the headrest.

As one aspect of the present invention, the connecting element of the push button may further include a rod portion projecting outwardly therefrom, and the resilient anchor region of the push button may be a resilient conical anchor region defined in a free end of the rod portion. In this mode, the push button is slidingly accommodated in the cylindrical element, with the resilient conical anchor region thereof being disposed at a point corresponding to the connecting hole of the lever element. The resilient conical anchor region has a maximum outer diameter larger than a diameter of the connecting hole of the lever element to an extent of allowing resilient squeeze and passage of the resilient conical anchor region in and through the connecting hole of the lever element and eventually allowing resilient recovery of the resilient conical anchor region to have the maximum outer diameter, so that the connecting element of the push button is anchoringly and securely connected, via the resilient conical anchor region thereof, with the connecting portion of the lever element.

As another aspect of the invention, the connecting portion of the lever element may include a free end region in which the connecting hole is defined, the free end region having an inwardly facing surface facing inwardly of the three-dimensional frame element and an outwardly facing surface opposite to the inwardly facing surface. The connecting element of the push button extends outwardly along a central axis of the push button, and includes defined therein, a resilient conical anchor region which corresponds to the resilient anchor region, and a detent region. The resilient conical anchor region is defined in a free end of the connecting element. In this mode, the push button is slidingly accommodated in the cylindrical element, with the resilient conical anchor region thereof being disposed in a coaxial relation with the connecting hole of the lever element. The resilient conical anchor region has a maximum outer diameter larger than a diameter of the connecting hole of the first portion to an extent of allowing resilient squeeze and insertion of the resilient conical anchor region in and through the connecting hole of the lever element and eventually allowing resilient recovery of the resilient conical anchor region to have the maximum outer diameter, so that the connecting element of the push button is anchoringly engaged, at the resilient conical anchor region thereof, with the inwardly facing surface of the free end region of the connecting portion of the lever element, while the detent region of the push button is contacted with the outwardly facing surface of the free end region of the connecting portion.

As still another aspect of the invention, the lever element may comprise: a first lever portion in which the connecting portion and the connecting hole of the lever element are defined; and a second lever portion operatively connected with the lock gear. The elongated guide hole element may comprise: a first elongated guide hole defined in the first lever portion; and a second elongated guide hole defined in the second lever portion. The guide element may comprise a first guide element and a second guide element, both of which are formed in the inner surface of the three-dimensional frame so as to project inwardly thereof. The first elongated guide hole of the first lever portion is slidably supported by the first guide element at a first predetermined position so as to be prevented against dislocation from the predetermined first position. The second elongated guide hole of the second lever portion is slidably supported by the second guide element at a second predetermined position so as to be prevented against dislocation from the second predetermined position. With such arrangement, the connecting hole of the lever element is positively maintained in a coaxial relation with the through-bore of the cylindrical element.

Other various features and advantages will become apparent from reading of the description, hereinafter, with reference to the accompanied drawings.

DETAILED DESCRIPTION OF PREFERRED EMBODIMENT OF THE INVENTION

Referring to FIGS. 1 to 5, there is illustrated a preferred embodiment of an unlocking mechanism of a push button type, as generally indicated by UM, provided in an inclinable headrest HR, in accordance with the present invention.

Figure 1:
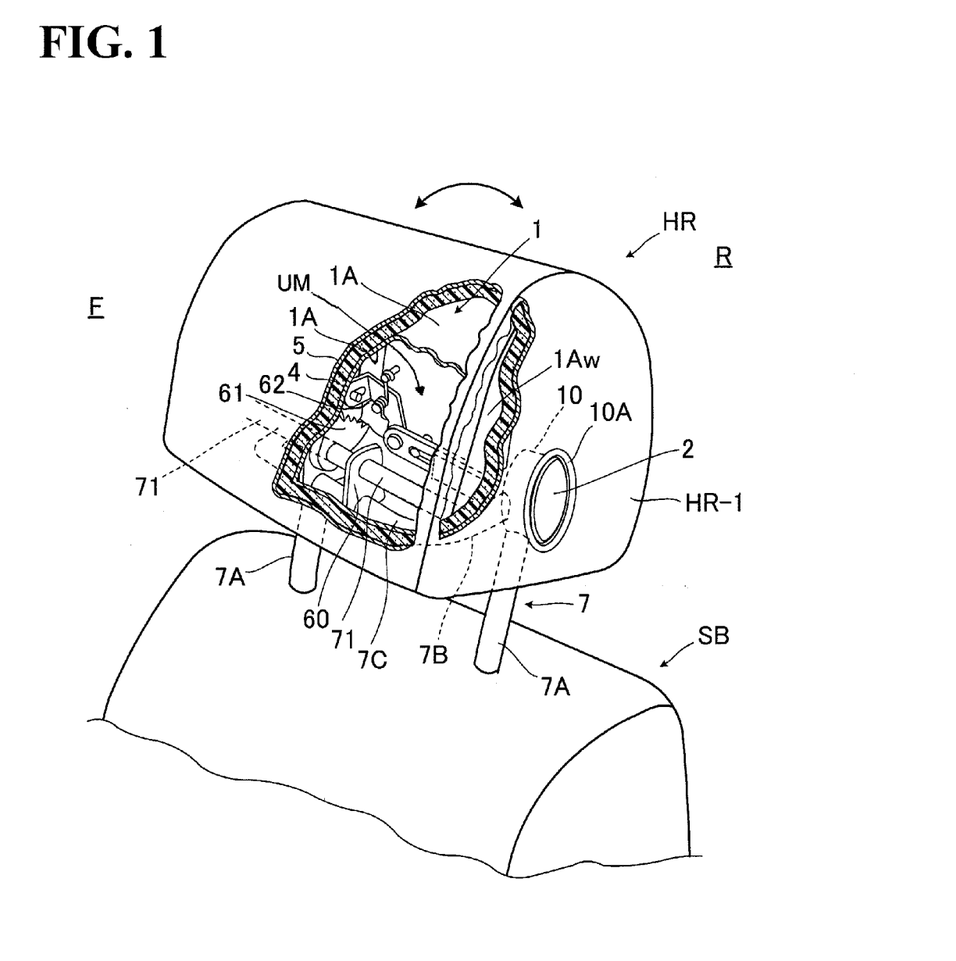
FIG. 1 is a partly broken schematic perspective view which shows an inclinable headrest having a push-button-type unlocking mechanism in accordance with the present invention.

The headrest HR per se includes a push button 2 which is partially exposed from one lateral wall HR-1 (on the right side) thereof, as shown in FIG. 1. In brief, the push button 2 is an unlocking bush button which can be directly pushed by a finger of a user to actuate the unlocking mechanism UM for releasing the headrest HR from a locked state, to thereby permit for adjustable inclination of the headrest.

The headrest HR includes a known headrest stay 7 for supportively mounting a body of the headrest on a top of a seat back, as seen in FIG. 1. The headrest stay 7 is so formed to have a transversely extending base portion 7C, a pair of horizontally extending side portions 7B and 7B, and a pair of pillar portions 7A and 7A which extend vertically from those two side portions 7B and 7B, respectively, as best shown in FIG. 2.

Interiorly of the headrest HR, as is known, there are provided a base bracket 60, a stationary gear 61 and a vertically rotatable lock gear 52, which form an inclination adjustment mechanism by which a body of the headrest HR can be adjustingly inclined relative to the headrest stay 7. In the shown embodiment, the stationary gear 61 is a ratchet gear, but may be another suitable form of gear. The base bracket 60 is connected fast to the transverse upper portion 7C of the headrest stay 7. As seen in FIG. 2, a support rod 70 is fixedly coupled with two upwardly extending portions of that base bracket 60 and lies above the headrest stay's upper portion 7C. Though not clearly shown, it is to be understood that two opposite ends of such support rod 70 are rotatably connected to two lateral wall portions 1Aw and 1Aw of a first half frame portion 1, respectively. As will be described later, the first half frame portion 1A is securely coupled with a second half frame portion 1B to form one internal frame 1, and substantially an entirety of such one internal frame 1 is covered with a covering element or an upholstery which comprises a trim cover assembly 5 and a foam padding 4, so that the illustrated body of the headrest HR is formed. Thus, the internal frame 1 or the headrest HR is basically free to rotate or incline relative to the support rod 70.

The ratchet gear 61 is fixed to the support shaft 70, whereas the lock gear 62 is rotatably attached via a pin 62A to an inwardly projected region 1B-5 formed in the second frame portion 1B. Under a biasing force of a biasing spring 33 to be described later, a toothed region 62C of the lock gear 62 is normally kept in a meshed engagement with a toothed region 61A of the ratchet gear 61, so that the headrest HR is normally placed in a locked state.

Hereinafter, note that the wording, "forward" or "forwardly", refers to a forward side F that faces forwardly of the headrest HR, whereas the wording "rearward" or "rearwardly" refers to a rearward side R that faces rearwardly of the headrest HR.

In brief, disengagement of the lock gear 62 from the stationary or ratchet gear 61 releases the headrest HR from a locked state and permits forward and rearward inclination of that headrest HR with respect to the headrest stay's two pillar portions 7A upon the seat back SB, as indicated by the arrow in FIG. 1. Then, a user can adjustingly incline and set the headrest HR at a desired angle of inclination in the forward and rearward directions.

In accordance with the present invention, the internal frame 1 is provided as one of constituent elements of the unlocking mechanism UM. This internal frame 1 assumes a substantially cubic or three-dimensional configuration on the whole and comprises a first half frame portion 1A and a second half frame portion 1B. The internal frame 1 itself is formed from a synthetic resin material.

Figure 3:
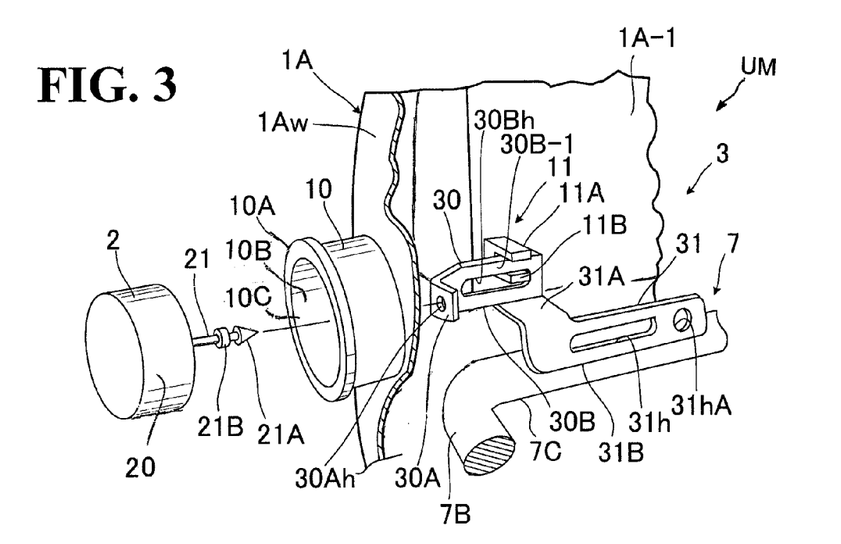
FIG. 3 is a diagram which explanatorily shows how a push button is securely connected with a slidable lever element provided in an internal frame of the headrest.

As best seen in FIG. 3, the first half frame portion 1A includes, defined in the inner surface thereof, an inwardly protruded area 1A-1 having a flat surface region 1A-1a which is shown as extending vertically inside of the first half frame portion 1A. A guide element 11 to be described later is integrally formed in such flat surface region 1A-1a. The guide element 11 has a pair of spaced-apart first and second guide pieces 11A and 11B formed integrally therein. On the other hand, the second half frame portion 1B also includes, defined in the inner surface thereof, an inwardly protruded area 1B-1 having a flat surface region 1B-1a which is shown as extending vertically inside of the second half frame portion 1B.

A cylindrical element 10 is formed integrally in one lateral wall 1Aw (on the right side) of the first half frame portion 1A so as to extend outwardly. The cylindrical element 10 has a through-bore 10C defined therein and is adapted to accommodate the push button 2 in the through-bore 10C thereof, such that the push button 2 is slidingly movable therein. As understandable from FIGS. 3 and 4, the through-bore 10C communicates the inside of the first half frame portion 1A with the outside thereof. Designation 10A denotes a circular flange integrally formed in the free end of the cylindrical element 10.

Figure 4:
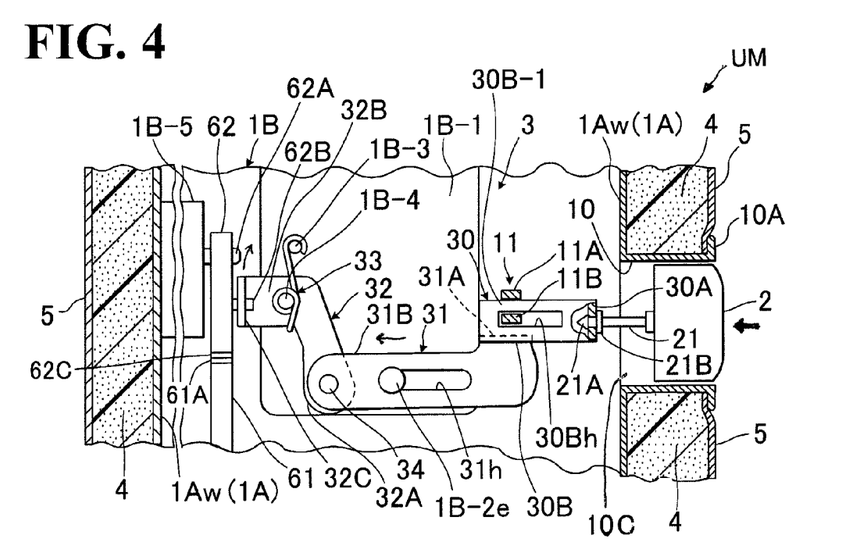
FIG. 4 is a sectional view showing the principal part of the present invention.

Also, in accordance with the present invention, the push button 2 is provided as one of constituent elements of the unlocking mechanism UM. The push button 2 is formed from a synthetic resin material in the illustrated columnar shape and includes: a connecting rod 21; a conical anchor region 21A; and a disc-like or circular detent region 21B. As will be elaborated later, those three portions 21, 21A and 21B are adapted for coaxial connection of the push button 2 with a first plate lever portion 30 of a slidable lever element 3. As shown in FIGS. 3 and 4, the connecting rod 21 is formed centrally in the push button 2 so as to project outwardly along the central axis of the push button 2. The conical anchor region 21A and circular detent region 21B are defined integrally in the free end portion of the connecting rod 21 so as to be spaced apart from each other.

The push button 2 has an outer peripheral surface 20. The outer diameter of such outer peripheral surface 20 is slightly smaller than an inner diameter of the cylindrical element 10 (i.e. a diameter of the through-bore 10C), to the extent that the outer circumferential surface 20 of the push button 2 is in a close and slidable contact on the inner circumferential surface 10B of the cylindrical element 10. As will be described, such arrangement insures to prevent wobbling and dislocation of both connecting rod 21 and conical anchor region 21A from a central axis of the cylindrical element 10, during the step where a worker inserts the push button 2 into the through-bore 10C of the cylindrical element 10 in assembly.

Furthermore, in accordance with the present invention, as one of constituent elements of the unlocking mechanism UM, there are provided a slidable lever element 3 and a rotatory actuator link 32, as seen in FIG. 2.

The rotary actuator link 32 is of a substantially "inverted L" shape and formed from a flat steel plate material so as to define: a vertically extending plate portion 32A; a horizontally extending plate portion 32B; and a bent connecting portion 32C extending at substantially a right angle from the horizontally extending plate portion 32B. The bent connecting portion 32C has an elongated hole 32h formed therein (see FIG. 2).

As illustrated, both vertically and horizontally extending plate portions 32A and 32B are not bent and not irregularly deformed, either, but extend in a straight line on a same plane. This is important for disposing an entirety of those two plate portions 32A and 32B in a close and slidable contact on the flat surface region 1B-1a of the inwardly protruded area 1B-1, as will be stated later. By contrast, the bent connecting portion 32C projects outwardly from a plane where both two plate portions 32A and 32B extend in a straight line. As shown in FIG. 2, the elongated hole 32h of that bent connecting portion 32C is slidably engaged with a connecting pin 62B of the lock gear 62.

Figure 5:
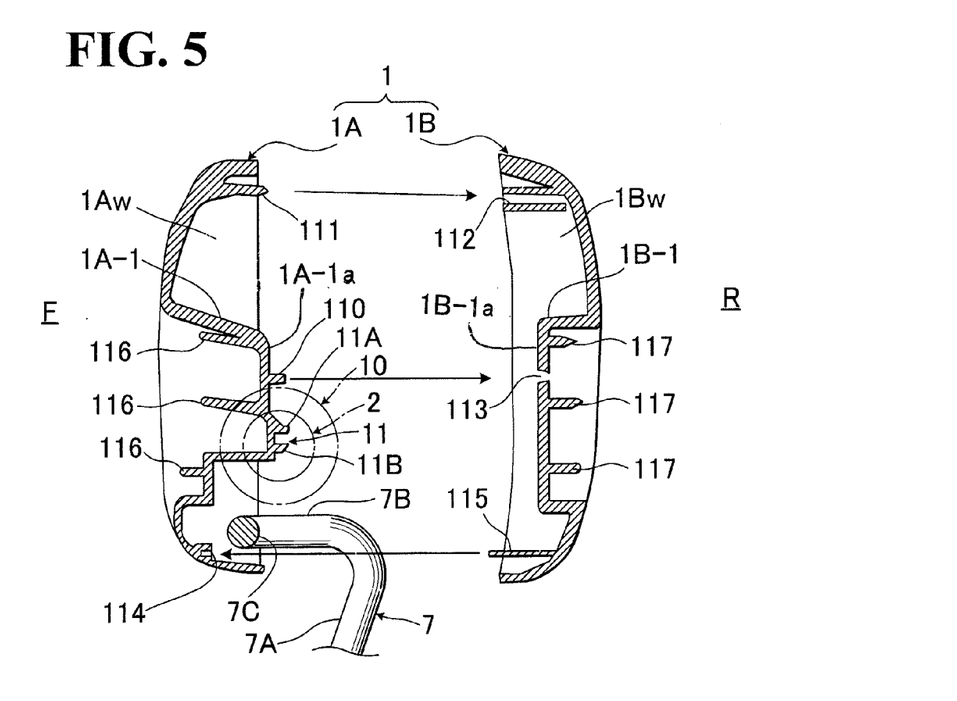
FIG. 5 is an exploded sectional view of the internal frame, which shows how to assemble the internal frame.

As shown in FIG. 4, in this rotary actuator link 32, an intermediate region between the vertically and horizontally extending portions 32A and 32B is rotatably connected with a pin 1B-4 fixed on the inwardly protruded area 1B-1 of the second frame half portion 1B. Referring to FIGS. 4 and 5, it is to be understood that both of those two portions 32A and 32B of the rotary actuator link 32 are in a close and slidable contact on the flat surface region 1B-1a of the inwardly protruded area 1B-1 and free to rotate clockwise and anticlockwise relative to the pin 1B-4.

A biasing spring 33 is wound about the afore-said pin 1B-4, such that the upper end thereof is securely connected with a pin 1B-3 fixed to the inwardly protruded area 1B-1, while the lower end thereof securely connected with the horizontally extending portion 32B of the rotary actuator link 3. Thus, by means of the biasing spring 3, the rotary actuator link 3 is biasingly caused to rotate anticlockwise about the pin 1B-4, which in turn biasingly causes clockwise rotation of the lock gear 62 about the pin 62A, so that the toothed region 62C of the lock gear 62 is normally kept in mesh with the toothed region 61A of the ratchet gear 61.

As shown in FIGS. 3 and 4, the slidable lever element 3 is formed from a steel plate material so as to have, integrally defined therein, a first lever plate portion 30 adapted for connection with the push button 2 and a second lever plate portion 31 adapted for connection with the rotary actuator link 3.

The first lever plate portion 30 is formed by a rectilinearly extending body region 30B and a right-angled connecting end region 30A in an integral manner. The body region 30B has an elongated guide hole 30Bh formed therein. The elongated guide hole 30Bh extends along the longitudinal direction of the body region 30B. On the other hand, the right-angled connecting end region 30A extends at a right angle from the free end of the afore-said body region 30B as shown and has a connecting hole 30Ah formed centrally therein.

The second lever plate portion 31 is formed by: a rectilinearly extending body region 31B; and an elongated guide hole 31h formed in that body region 31B so as to extend along the longitudinal direction thereof. Designation 31hA denotes a connecting hole formed in the free end portion of the second lever plate portion 31.

As shown in FIG. 3, a horizontally extending transition region 31A is defined integrally between the first and second lever plate portions 30 and 31 so as to form a horizontal bridge therebetween. It is observed that the first and second plate lever portions 30 and 31 extend lengthwise in a direction opposite to each other with respect to that transition region 31A, while also extending vertically in a direction opposite to each other with respect thereto. In other words, the two body regions 30B and 31B respectively of the first and second plate lever portions 30 and 31 are offset from each other lengthwise and vertically in relation to the transition region 31A, while extending in a parallel relation with each other.

As can be seen in FIGS. 2 and 4, in practical assembly, the second lever plate portion 31 of the slidable lever element 3 is first brought to the outwardly protruded area 1B-1 of the second half frame portion 1B, and then, the elongated guide hole 31h of the second plate lever portion 31 is slidably engaged with a guide pin 1B-2, wherein the guide pin 1B-2 is fixed on the flat surface region 1B-1a of the outwardly protruded area 1B-1 as understandable from FIGS. 2 and 5, whereas the connecting hole 31hA of the second lever plate portion 31 is rotatably and securely connected with a connecting pin 34 fixed to the free end of vertically extending portion 32A of the rotary actuator link 32. On the other hand, the first lever plate portion 30 is disposed forwardly of the second half frame portion 1B relative to the second lever plate portion 31, as seen in FIG. 2.

Designation 1B-2e denotes a detent element fixedly secured to the guide pin 1B-2. This detent element 1B-2e prevents removal of the elongated guide hole 31h from the guide pin 1B-2 from and insures to guide the body region 31B of the first plate lever portion 31 stably along the longitudinal direction of the elongated guide hole 31h.

Accordingly, the second lever plate portion 31 is not only rotatably connected with the rotary actuator link 32, but also slidably connected with the guide pin 1B-2, in the vicinity of the second half frame portion 1B, as seen in FIG. 2.

Then, the first half frame portion 1A is coupled with the second half frame portion 1B in which the slidable lever element 31 has been installed as described above, with a care being taken to insure that the guide element 11 formed in the first half frame portion 1A is slidably engaged with the first lever plate portion 30 disposed on the side of the second half frame portion 1B. More specifically in this respect, as understandable from FIGS. 3 and 5, when coupling the first half frame portion 1A with the second half frame portion 1B, a localized area designated by 30B-1 in the first plate lever portion 30, which is defined between the upper edge of that first lever plate portion 30 and the elongated guide hole 30Bh thereof, is automatically inserted in and between the first and second guide pieces 11A and 11B of the guide element 11, such that the second guide piece 11B is slidably engaged in the elongated guide hole 30Bh. At this point, as best observed in FIG. 3, the right-angled connecting end region 30A of the first plate lever portion 30 is situated interiorly of the first half frame portion 1A as well as in the proximity of the cylindrical element 10, and the connecting hole 30Ah of the right-angled connected end region 30A faces toward the through-bore 10C of the cylindrical element 10. It is noted here that a center of the connecting hole 30Ah is disposed in a concentric alignment with a center of the cylindrical element 10 by the reason of factors to be set forth later.

At the above-described steps, the internal frame 1 is formed as roughly shown in FIG. 5. Namely, although not shown clearly, it is to be understood that the first half frame portion 1A has, integrally formed therein, a plurality of connecting projections 110 and 111 and a plurality of connecting holes 114, whereas the second half frame portion 1B has, integrally formed therein, a plurality of connecting holes 112 and 113 and a plurality of connecting projections 115. Thus, in brief, all the connecting projections 110, 111 and 115 are securely inserted in all the corresponding connecting holes 113, 112 and 114, respectively, as indicated by the arrows in FIG. 5, and then, the first and second half frame portions 1A and 1B are firmly connected together by means of suitable bonding agent, whereupon one internal frame 1 is formed. Note that, in this FIG. 5, all the mechanical elements, such as the ratchet and lock gears 61 and 62, rotary actuator link 32, and slidable lever element 3, are omitted for the sake of clarity.

In the FIG. 5, designations 116 and designations 117, respectively, denote: a plurality of first reinforcing ribs formed in the outer surface of the first half frame portion 1A; and a plurality of second reinforcing ribs formed in the outer surface of the second half frame portion 1B. Specifically, as seen in FIG. 5, the first reinforcing ribs 116 are formed integrally in the recessed outer surface region of the first half frame portion 1A which corresponds to the inwardly protruded area 1A-1, whereas likewise, the second reinforcing ribs 117 are formed integrally in the recessed outer surface region of the second half frame portion 1B which corresponds to the inwardly protruded area 1B-1. Though not clearly shown, it is be also understood from the FIG. 5 that the first reinforcing ribs 116 extend transversely in the afore-said recessed surface region of the first half frame portion 1A, and likewise, the second reinforcing ribs 117 extend transversely in the afore-said recessed surface region of the second half frame portion 1B. Owing to such reinforcing arrangement, both two inwardly protruded areas 1A-1 and 1B-1 are prevented from being deformed by an external load applied thereto during assembly, and also prevented from being shrunk and swollen due to changes of ambient temperature, which therefore insures that the two flat surface regions 1A-1a and 1B-1a respectively of those two inwardly protruded areas 1A-1 and 1B-1 are each maintained flat and even on the whole.

Upon the completion of coupling the first and second half frame portions 1A and 1B together to form one internal frame 1 as explained above, the afore-said two flat surface regions 1A-1a and 1B-1a face to each other in a spaced-apart and parallel relationship, as understandable from FIG. 5, and it is to be appreciated that:

(a) Each of the two flat surface regions 1A-1a and 1B-1a provides a flat surface perpendicular to a horizontal line extending across the internal frame 1.

(b) An entirety of the rotary actuator link 32, excepting its right-angle end region 32C, is maintained via the pin 1B-4 in a slidable contact upon such flat surface region 1B-1a of the inwardly protruded area 1B-1, thereby being rotatably retained at a predetermined position precisely, while being prevented against forward and rearward wobbling and dislocation from that predetermined position.

(c) The second lever plate portion 31 of the slidable lever element 3 is at one end thereof movably connected with the foregoing rotary actuator link 32 via the pin 34 and also is at the elongated guide hole 31h thereof slidingly engaged with the guide pin 1B-2 fixed to the afore-said flat surface region 1B-1a. With such arrangement, the second lever plate portion 31 is positively supported at a predetermined position, while being prevented against vertical and rearward wobbling and dislocation from that predetermined position. Further, the detent element 1B-2e fixed to the guide pin 1B-2 prevents the second lever plate portion 31 against forward wobbling and dislocation from the predetermined position. Hence, a whole of the second lever plate portion 31 is prevented by the three points, i.e. the rotary actuator link 32, guide pin 1B-2 and detent element 1B-2e, against vertical and horizontal wobbling and dislocation with respect to the second half frame portion 1B. It is added here that, with those arrangements, when coupling the first and second half frame portions 1A and 1B together, the second guide piece 11B of the guide element 11 provided on the side of the first half frame portion 1A is precisely inserted in the elongated guide hole 30Bh of the first lever plate portion 30 provided on the side of the second half frame portion 1B, thereby insuring that the first lever plate portion 30 is slidably engaged with the guide element 11.

(d) The first plate lever portion 30, owing to its slidable engagement with the guide element 11, is positively retained at a predetermined position, and prevented thereby against vertical wobbling and dislocation from the predetermined position thereof.

The arrangements discussed in the foregoing points (a) to (d) insure to prevent the first lever plate portion 30 against vertical and horizontal wobbling and dislocation within the internal frame 1, whereupon the connecting hole 30Ah of that first lever plate portion 30 is positively maintained in a concentric and coaxial relation with the cylindrical element 10.

Subsequent to the foregoing formation of internal frame 1, as understandable from FIG. 1, an upholstery comprising the trim cover assembly 5 and foam padding 4 is affixed on substantially an entire outer surface of the internal frame 1. During this step, it is to be understood from FIG. 4 in conjunction with the FIG. 1 that the cylindrical element 10 is embedded in and surrounded by the foam padding 4, with the circular flange portion 10A thereof overlaying the outer surface of the trim cover assembly 5, so that the through-bore 10C of the cylindrical element 10 opens in the lateral wall HR-1 of the headrest HR and is viewed from the outside. Therefore, at this point, the headrest HR is incompletely formed, prior to the push button 2 being inserted in that through-bore 10C.

Then, a worker should hold the push button 2 with his or her one hand and bring that push button 2, with the connecting rod 21 and conical anchor region 21A thereof facing ahead, towards the cylindrical element 10, as understandable from FIG. 3. Consequently, as indicated by the line in FIG. 3, the body of the push button 2 is slidingly inserted in the through-bore 10C of the cylindrical element 10, while the conical anchor region 21A of the push button 2 is being moved straight toward the connecting hole 30Ah formed in the right-angled connecting end region 30A of the first lever plate portion 30. And eventually, the conical anchor region 21A is resiliently squeezed in and passed frictionally through that connecting hole 30Ah, while a localized portion of the connecting rod 21 between the conical anchor region 21A and circular detent region 21B is inserted in that particular connecting hole 30Ah. It is noted here that a maximum outer diameter of the conical anchor region 21A (i.e. an outer diameter of the largest-diameter end thereof opposite to the pointed end thereof) is slightly larger than a diameter of the connecting hole 30Ah to the extent of allowing resilient squeeze and passage of the conical anchor region 21A in and through the connecting hole 30Ah.

As a result thereof, the conical anchor region 21A resiliently recovers its original shape and is anchoringly engaged on the inwardly facing surface of the right-angled connecting end region 30A against removal therefrom, as best seen in FIG. 4, and at the same time, the circular detent region 21B is contacted with the outwardly facing surface of the right-angled connecting end region 30A, as also best seen in FIG. 4.

Hence, the right-angled connecting end region 30A is securely sandwiched and retained between those conical anchor region 21A and circular detent region 21B against removal thereof from the connecting rod 21 of the push button 2.

Due to the above-described connecting processes, the worker now feels a clicked engagement of the push button's conical anchor region 21A with the slidable lever element's connecting hole 30Ah and also feels stop of the push button 2 in the cylindrical element 10. Thus, he or she can readily ascertain that the push button 2 is completely connected with the slidable lever element 3 against removal therefrom. In that quite simple manner, the push button 2 is normally positioned in the cylindrical element 10 as shown in FIG. 1, with the top portion of the push button 2 being exposed and accessible at one lateral wall HR-1 of the headrest HR.

As constructed above, when a user uses his or her finger to press the push button 2 deep in the cylindrical element 10 against the biasing force of the biasing spring 33, both first and second lever plate portions 30 and 31 are displaced in a leftwise direction towards the ratchet and lock gears 61 and 62, as indicated by the leftwise arrows in FIG. 4. In this regard, the first lever plate portion 30 is moved rectilinearly in the leftwise direction, with the elongated guide hole 30Bh thereof being slidingly guided by the guide element 11, while at the same time, the second lever plate portion 31 is moved rectilinearly in the leftwise direction, with the elongated guide hole 31h thereof being slidingly guided by the guide pin 1B-2 (see FIG. 2). Concurrent therewith, the rotary actuator link 32 rotatably connected with the second lever plate portion 31 is rotated clockwise about the pin 1B-4 against the biasing force of the spring 33, as indicated by the upward arrow in FIG. 4, which in turn causes upward rotation of the lock gear 62 relative to the pin 62A, with the result that the toothed region 62C of that lock gear 62 is disengaged from the toothed region 61A of the ratchet gear 61, thereby releasing the headrest HR from a locked state.

While keeping the push button 2 in the thus-pressed state with his or her finger, the user can adjustingly incline the headrest HR forwardly and rearwardly with respect to the seat back SB, as indicated by the arrow in FIG. 1. When the user releases his or her finger from the push button 2, under the biasing force of the spring 33, the rotary actuator link 32 is caused to rotate anticlockwise about the pin 1B-4, which results in downward rotation of the lock gear 62 relative to the pin 62A and also results in rightwise translation of both first and second plate lever portions 30 and 31 towards the cylindrical element 10 at the same time. Hence, the toothed region 62C of the lock gear 62 is automatically engaged with the toothed region 61A of the ratchet gear 61, thereby locking the headrest HR at a desired angle of inclination, while simultaneously, the push button 2 is automatically returned to a home position in the cylindrical element 10, with the top portion thereof being exposed therefrom, as seen in FIGS. 1 and 4.

From the descriptions above, it is to be appreciated in accordance with the present invention that the following effects and advantages are attainable:

(i) As specifically described earlier, the slidable lever element 3 is positively supported by the guide pin 1B-2 and guide element 11 at a predetermined position, wherein those guide pin and elements 1B-2 and 11 are fixed to the previously-explained flat surface regions 1A-1a and 1B-1a, respectively, so that the slidable lever element 3 as a whole is prevented against dislocation in any direction within the internal frame 1, thus insuring that the connecting hole 30Ah of the slidable lever element 3 is located and retained at a point concentric or coaxial with the through-bore 10C of the cylindrical element 10.

(ii) The push button 2 has the connecting rod 21 and conical anchor region 21A, both of which extend along the central axis of the push button 2. Further, a whole of the outer peripheral surface 20 of that push button 2 can be slidably and closely contacted on and along the inner circumferential surface 10B of the cylindrical element 10, as understandable from FIGS. 3 and 4.

(iii) By the virtue of the arrangements stated in the (i) and (ii) above, when inserted in the cylindrical element 10, the push button 2 slides in and along the cylindrical element 10, without any wobbling and dislocation, due to the close and slidable contact of the push button's outer peripheral surface 20 with the inner circumferential surface 10B of the cylindrical element 10. Thus, at this point of time, both connecting rod 21 and conical anchor region 21A of the push button 2 are assuredly maintained in a coaxial relation with the connecting hole 30Ah of the slidable lever element 3, and therefore, as a worker slides the push button 2 far into the cylindrical element 10, the conical anchor region 21A thereof is automatically, precisely inserted in and anchoringly engaged with that connecting hole 30Ah. In other words, by simply inserting the bush button 2 into the cylindrical element 10, a worker can easily feel a clicked engagement of the push button's conical anchor region 21A with the connecting hole 30Ah associated with the slidable lever element 3, and also can feel stop of the push button 2 in the cylindrical element 10 due to contact of the circular detent region 21B with the outwardly facing surface of the right-angled connecting end region 30A. Thus, the worker can clearly ascertain the completion of connecting the push button 2 with the slidable lever element 3 that is invisibly disposed within the headrest HR.

(iv) The first lever plate portion 30 can be formed small in length and disposed interiorly of the internal frame 1, as opposed to the long extended operating portion of the previously stated JP 2001-46170, which passes outwardly through the internal frame thereof. Therefore, in the present invention, such small-length formation lessens the bendability and deformability of the first plate lever portion 30 or rather increases the rigidity thereof, and also the first lever plate portion 30 is protected by the internal frame 1 from contact with any external object. These factors insure to prevent occurrence of irregularity in the shape of the first plate lever portion 30 during formation of that first plate lever portion 30 and also insure to prevent accidental bending and deformation of the first plate lever portion 30 during assembly of the headrest. Therefore, such factors serve to assist in maintaining the coaxial relation between the connecting hole 30Ah of the first plate lever portion 30 and the through-bore 30C of the cylindrical element 10.

In this context, there is the possibility that the center of the connecting hole 30Ah may happen to be slightly dislocated from a central axis of the through-bore 30C, but due to the above-discussed many structural advantages and effects, such dislocation will be so slight as to be limited and absorbed within a wide space given between the pointed end of the conical anchor region 21A and the inner circumferential edge of the connecting hole 30Ah. Thus, in that case, when inserting the push button 2 in the through-bore 30C, the pointed end of the conical anchor region 21A is assuredly inserted in the connecting hole 30Ah, with the result that a whole body of the conical anchor region 21A can be resiliently squeezed in and passed frictionally through the connecting hole 30Ah, so that the push button 2 is successfully connected with the slidable link element 3.

While having described the present invention thus far, it is to be understood that the invention is not limited to the illustrated embodiment, but any modification, addition and replacement may be applied thereto, without departing from the scopes of the appended claims. For example, the cylindrical element 10 may be formed anywhere in the internal frame 1, either in the second half frame portion 1B or in the first half frame portion 1A, and according to such alteration, the slidable lever element 3 be so formed to extend rectilinearly on the whole, such that both first and second lever plate portions 30 and 31 thereof extend in a same straight line, insofar as the connecting hole 30Ah of the first plate lever portion 30 is located and retained at a point concentric with the through-bore 30C of the cylindrical element 10. Or alternatively, the slidable lever element 3 be formed such that the first lever plate portion 30 thereof extends rectilinearly along a line above or below the second lever plate portion 31 so that the first and second lever plate portions 30 and 31 are disposed in a vertically offset relationship in reference to a central line of the slidable lever element 3, insofar as the connecting hole 30Ah of the first plate lever portion 30 is located and retained at a point concentric with the through-bore 30C of the cylindrical element 10.

What is claimed is:

1. An unlocking mechanism provided in a headrest, said headrest including:
   a covering element; and
   an inclination adjustment mechanism operable for adjustment of inclination of the headrest, said inclination adjustment mechanism including a stationary gear and a lock gear movable for engagement with and disengagement from said stationary gear,
   said unlocking mechanism comprising:
   a three-dimensional frame provided within the headrest, said three-dimensional frame having an inner surface facing an inside thereof and an outer surface facing an outside thereof said inclination adjustment mechanism disposed within said three-dimensional frame;
   a cylindrical element formed integrally with said three-dimensional frame so as to project outwardly from said outer surface of the three-dimensional frame, said cylindrical element having a through-bore defined therein, said through-bore communicating between the inside of the three-dimensional frame and the outside thereof;
   a guide element formed in said inner surface of said three-dimensional frame so as to project inwardly of the three-dimensional frame; wherein said covering element is affixed on said three-dimensional frame, such that said through-bore of said cylindrical element opens in the covering element;
   a lever element disposed within said three-dimensional frame and operatively connected with said lock gear, said lever element including:
      an elongated guide hole element defined therein;
      a connecting portion aligned with said cylindrical element; and
      a connecting hole defined in said connecting portion;
   said lever element being at said elongated guide hole element slidably engaged with said guide element, thereby maintaining said connecting hole of the lever element in a coaxial relation with said through-bore of said cylindrical element;
   a push button including a connecting element formed to project outwardly therefrom, said connecting element including a resilient anchor region having an outer shape slightly larger than said connecting hole of said lever element, said resilient anchor region being capable of being resiliently squeezed to pass through said connecting hole and also capable of resilient recovery of the shape thereof subsequent to being resiliently squeezed and passed through the connecting hole;

said push button being slidably accommodated in said cylindrical element and securely connected at the connecting element thereof with said connecting portion of said lever element by being slidingly inserted in said through-bore of the cylindrical element such that said resilient anchor region of the push button is resiliently squeezed in and passed through said connecting hole of said lever element and subsequently recovers said shape thereof resiliently, so that said connecting element of the push button is securely connected via said resilient anchor region thereof with said connecting portion of the lever element; and said push button being normally exposed partially in said cylindrical element as well as in said covering element.

2. The unlocking mechanism as claimed in claim 1, wherein said connecting element of said push button further includes a rod portion projecting outwardly therefrom, wherein said resilient anchor region of the push button is a resilient conical anchor region defined in a free end of said rod portion, wherein said push button is slidingly accommodated in said cylindrical element, with said resilient conical anchor region thereof being disposed at a point corresponding to said connecting hole of said lever element, and wherein said resilient conical anchor region has a maximum outer diameter larger than a diameter of said connecting hole of said lever element to an extent of allowing resilient squeezing and passage of the resilient conical anchor region in and through said connecting hole of said lever element and eventually allowing resilient recovery of the resilient conical anchor region to have said maximum outer diameter, so that said connecting element of said push button is anchoringly and securely connected, via the resilient conical anchor region thereof, with said connecting portion of said lever element.

3. The unlocking mechanism claimed in claim 1, wherein said connecting portion of said lever element includes a free end region in which said connecting hole is defined, said free end region having an inwardly facing surface facing inwardly of said three-dimensional frame element and an outwardly facing surface opposite to said inwardly facing surface, wherein said connecting element of said push button extends outwardly along a central axis of the push button, wherein said connecting element includes:

a resilient conical anchor region which corresponds to said resilient anchor region, and a detent region, wherein said resilient conical anchor region is defined in a free end of said connecting element, wherein said push button is slidingly accommodated in said cylindrical element, with said resilient conical anchor region thereof being disposed in a coaxial relation with said connecting hole of said lever element, and wherein said resilient conical anchor region has a maximum outer diameter larger than a diameter of said connecting hole of said connecting portion to an extent of allowing resilient squeeze and insertion of said resilient conical anchor region in and through said connecting hole of said lever element and eventually allowing resilient recovery of the resilient conical anchor region to have said maximum outer diameter, so that said connecting element of said push button is anchoringly engaged, at the resilient conical anchor region thereof, with said inwardly facing surface of said free end region of said connecting portion of said lever element, while said detent region of the push button is contacted with said outwardly facing surface of said free end region of said connecting portion.

4. The unlocking mechanism according to claim 3, wherein said push button has an outer peripheral surface, wherein said cylindrical element has an inner circumferential surface defining said through-bore thereof, and wherein said outer peripheral surface of the push button is in a close and slidable contact on said inner circumferential surface of the cylindrical element.

5. The unlocking mechanism as claimed in claim 1, wherein said lever element comprises:

a first lever portion in which said connecting portion and said connecting hole of the lever element are defined; and a second lever portion operatively connected with said lock gear, wherein said elongated guide hole element comprises:

a first elongated guide hole defined in said first lever portion; and a second elongated guide hole defined in said second lever portion, wherein said guide element comprises a first guide element and a second guide element, both of which are formed in said inner surface of said three-dimensional frame so as to project inwardly thereof, wherein said first elongated guide hole of said first lever portion is slidably supported by said first guide element at a first predetermined position so as to be prevented against dislocation from said first predetermined position, and wherein said second elongated guide hole of said second lever portion is slidably supported by said second guide element at a second predetermined position so as to be prevented against dislocation from said second predetermined position, whereupon said connecting hole of said lever element is positively maintained in a coaxial relation with said through-bore of said cylindrical element.

6. The unlocking mechanism as claimed in claim 1, wherein said three-dimensional frame is formed from a synthetic resin material.

7. The unlocking mechanism as claimed in claim 1, wherein said three-dimensional frame is formed from a synthetic resin material, wherein said three-dimensional frame includes a flat surface portion defined in the inner surface thereof, wherein the headrest further includes an actuator link element which is securely and movably provided on said flat surface portion at a first predetermined position so as to be in a slidable contact thereon, thereby being prevented against wobbling and dislocation from said first predetermined position, wherein said lever element includes:

a first lever portion in which said connecting portion and said connecting hole of the lever element is defined; and a second lever portion, wherein said elongated guide hole element is disposed between said first and second lever portions, wherein said lever element is at a first end portion thereof operatively connected with said lock gear, while being at a second end portion thereof operatively connected with said actuator link element, wherein said guide element is integrally formed on said flat surface portion at a second predetermined position, and wherein said lever element is at the elongated guide hole element thereof slidably supported by said guide element at said second predetermined position, while being at the second lever portion thereof operatively connected with said resilient anchor region, so that the lever element is prevented against wobbling and dislocation from said second predetermined position thereof, whereupon said connecting hole of the lever element in positively maintained in a coaxial relation with said through-bore of said cylindrical element.

8. The unlocking mechanism according to claim 5, wherein said three-dimensional frame includes a flat surface portion defined in the inner surface thereof, and wherein said first and second guide elements are formed integrally in said flat surface portion.

* * * * *

UNITED STATES PATENT AND TRADEMARK OFFICE
CERTIFICATE OF CORRECTION

PATENT NO. : 9,327,627 B2
APPLICATION NO. : 13/753154
DATED : May 3, 2016
INVENTOR(S) : Hideo Tobata et al.

Page 1 of 1

It is certified that error appears in the above-identified patent and that said Letters Patent is hereby corrected as shown below:

Title Page: insert Item (30)

-- (30)     Foreign Application Priority Data

January 31, 2012 (JP) ........................ 2012-017700 --

Signed and Sealed this
Twenty-first Day of June, 2016

Michelle K. Lee
*Director of the United States Patent and Trademark Office*